Patented Jan. 16, 1940

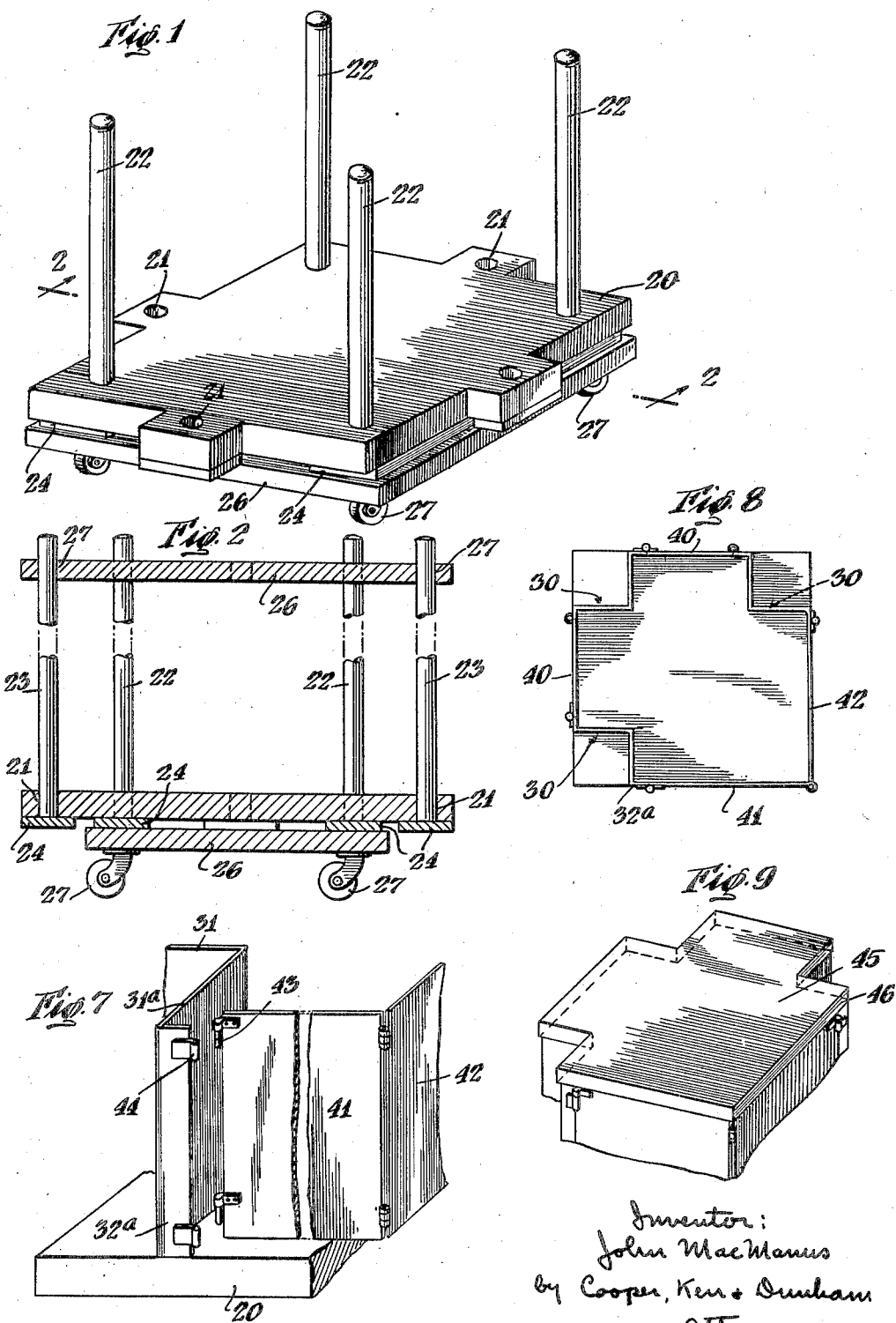

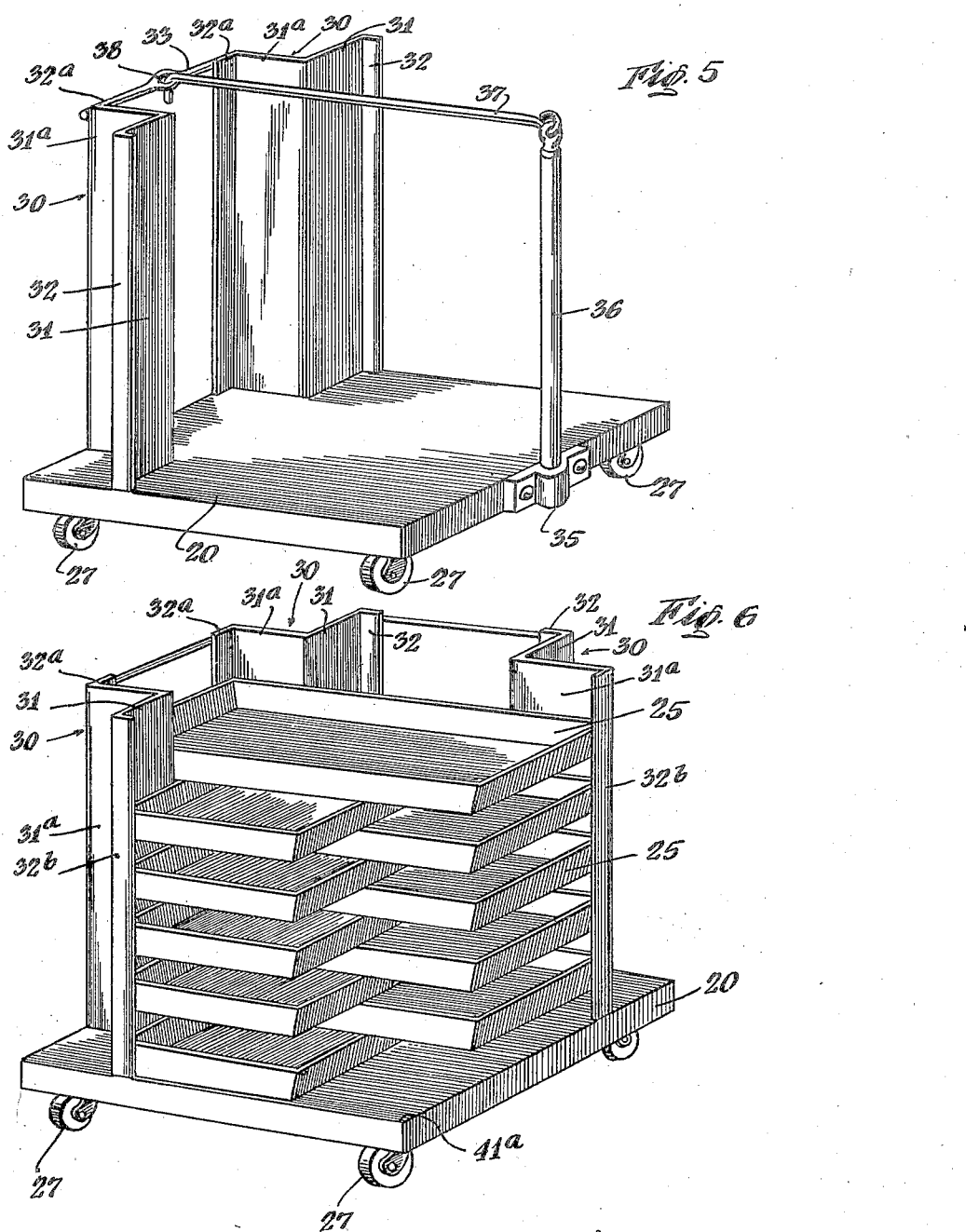

2,187,355

UNITED STATES PATENT OFFICE 2,187,355

APPARATUS FOR THE MANUFACTURE OF BAKED GOODS

John MacManus, New York, N. Y., assignor to Cushman's Sons Inc., New York, N. Y., a corporation of New York Original application February 4, 1937, Serial No. 124,070. Divided and this application November 5, 1937, Serial No. 172,934

7 Claims. (Cl. 211—49)

This invention relates to apparatus for the manufacture of baked goods, and more particularly for handling the goods in connection with one or more manufacturing operations of the bakery. It is particularly applicable to baking establishments adapted to operate on a relatively large scale, for making, for example, cakes, cookies, buns, rolls, special breads, and the like; the manufacturing procedure usually involves a plurality of steps, and especially in bakeries of the so-called "retail" character (where the object is to deliver the products as soon as possible after completion, i. e., "bakery-fresh", to a plurality of retail shops within a convenient range of local delivery) it is of great importance to reduce the time consumed in transferring the articles from one stage to another of the manufacturing procedure, and in delivering the finished goods to the distributing shop.

In the usual baking practice, after the dough has been mixed, it must be shaped and disposed in suitable receptacles, either by pouring it into appropriately-shaped pans or portions of pans, or, as in the case of cookies, coffee rings, or the like, where relatively stiff dough may be employed, by actually molding the dough into the desired shapes and placing the latter in flat pans. Thereafter the shaped articles may undergo what is commonly known as "proofing", viz., they are permitted to stand, usually in an atmosphere of steam or vapor, so that certain preliminary rising or other reactions may take place in the dough prior to actual baking. After proofing, the articles may be then transferred to the oven, although in many cases, where a particular kind of surface is desired, there may be an intermediate washing of the articles themselves with sugar or egg compositions or the like. Following the baking process in ovens of the usual character, further treatment is often applied to the articles, such as further washing, icing, or further coating or application of special materials. Thereafter, it is usually necessary to permit the articles to stand for a further period of time, with ample access of air, so as to provide the necessary drying-out after baking, and to afford such preliminary hardening or drying of the icing or other coating as will permit safe handling and transportation of the goods.

In bakeries of the character described, a common expedient has been to place the pans, after they have been filled with the shaped articles of dough, in racks that are of the nature of a plurality of shelves, arranged so that each pan rests upon its own support and has its top spaced a considerable distance below the bottom of the next pan above it in the rack. Access of air, steam or vapor is thus afforded to each pan, and it is in these racks that goods in the pans are given the usual proofing treatment. Thereafter the pans are removed from the racks, and after the articles may have been given such preliminary washing treatment as desired, the pans are then transferred to the oven for baking. Following baking, further processing, such as icing, may be carried out, and thereafter it has been necessary to replace the pans on the shelves of a rack of the kind just described, so that the required drying and setting may take place. For subsequent handling and distribution, the completed articles are then usually transferred to special shipping boxes or pans which are designed to meet the requisites of such handling, and to hold the goods with a minimum of waste space; since the goods must ordinarily reach a number of retail shops as quickly as possible, space in the delivery truck is manifestly at a premium. That is, in order to afford the necessary access of air to the goods, the racks previously described are necessarily large and cumbersome, while the shipping boxes or pans are usually open-topped boxes adapted to be substantially filled with baked goods, transferred from the baking pans that have been stored in the racks. It may also be noted that these shipping boxes or pans must usually be so stacked and handled, during transportation and during storage at the retail shop, as to prevent ready access for visual inspection of their contents.

An important object of the present invention is to provide means for substantially reducing the cost of bakery operations such as those of the character just described,—and particularly to reduce the time, and the expenses of labor and equipment, hitherto necessarily incidental to the handling of the goods during such operations. A further object is to provide means for reducing or obviating the inconveniences incidental to the use of present apparatus (such as the racks, for example, and pans or boxes described above),—such inconvenience as that due to the care and time necessary to fit each pan into a shelf of the described racks, or such inconveniences of handling and storage as arise from the relatively large bulk of the racks themselves, or the inconveniences of transferring the goods not only from the racks but from the actual baking pans to special shipping boxes or pans.

Other objects include improvements in manufacturing baked articles wherein the articles are shaped from dough and disposed in pans for baking, whereby handling of the articles before, during, intermediate, or after various stages of the manufacturing process (including eventual distribution to retail shops), may be greatly facilitated, without interfering with the desired access of air, vapor or the like to the goods during proofing, drying, or kindred treatments; and other objects include the provision of improvements in manufacturing of the character described, whereby one or more operations heretofore requiring manual or like handling of the actual goods may be eliminated, and whereby the goods may be so handled in pans or receptacles as to afford constant access to each individual pan or receptacle for visual observation of the contents.

Yet another object of the invention is to provide an improved carrier device for handling the goods during procedures of the character described, including actual processing steps, or subsequent shipment and storage, or both, such improved devices being economical, sturdy, extremely simple to use, and adapted to provide for the handling of large quantities of goods with a minimum of space.

To these and other ends which will be hereinafter apparent, or which are incidental to the several features or combinations hereinafter described, an important feature of the invention includes apparatus for handling the articles or goods, for example, from the time that they are originally shaped from the dough, by placing them in the pans in which they are to be baked, and establishing a stack of these pans, wherein the pans are directly placed upon each other, but successively crossed relative to each other (e. g., having their corresponding dimensions alternately disposed relative to each other), so that access is always afforded to the interior of each pan, for circulation of air or the like thereto, and for inspection of the goods therein. This apparatus may be adapted to maintain the pans in this stacked relation during one or more of the handling operations, including treatments such as proofing and eventual drying or setting, and including final transportation and storage of the completed goods, whereby a large quantity of articles may be handled merely by storing or moving a plurality of filled pans in that stacked relation. A further feature of the invention comprises a carrier device having a suitable base, conveniently provided with rollers or the like for moving the device about, and having means extending upwardly from the base, for holding a plurality of pans in the crossed stacked relation, just described, the last named means advantageously including upright members against which the pans abut, so that the pans may be stacked by simply inserting each one in a substantially horizontal direction, and so that the pans, after completion of the stack, may be held in the desired relation and against lateral displacement of any one of them. Means, preferably removable, may also be provided, if desired, for partially or completely enclosing the stack of pans on the base, without disturbing the goods in the pans, or the stacked relation of the latter; apparatus including this feature is particularly useful and of importance where, during transportation or storage of the goods, it is desired to prevent all access of weather, dust, or the like.

Referring to the drawings, which illustrate, by way of example, several presently preferred embodiments of the apparatus of the invention:

Figure 1 is a perspective view of one form of carrier device, with certain parts removed;

Figure 2 is a section taken on a vertical plane through the line 2—2 in Figure 1, but showing other elements of the device in position;

Figure 5 is a perspective view of another form of carrier device;

Figure 6 is a perspective view of yet another form of carrier device, shown loaded with pans;

Figure 7 is a fragmentary perspective view showing the arrangement for applying side enclosures to devices such as that shown in Figure 6;

Figure 8 is a plan view of the device enclosed as in Figure 7; and

Figure 9 is a perspective view of the device of Figure 8, with the cover thereon.

Figure 3:
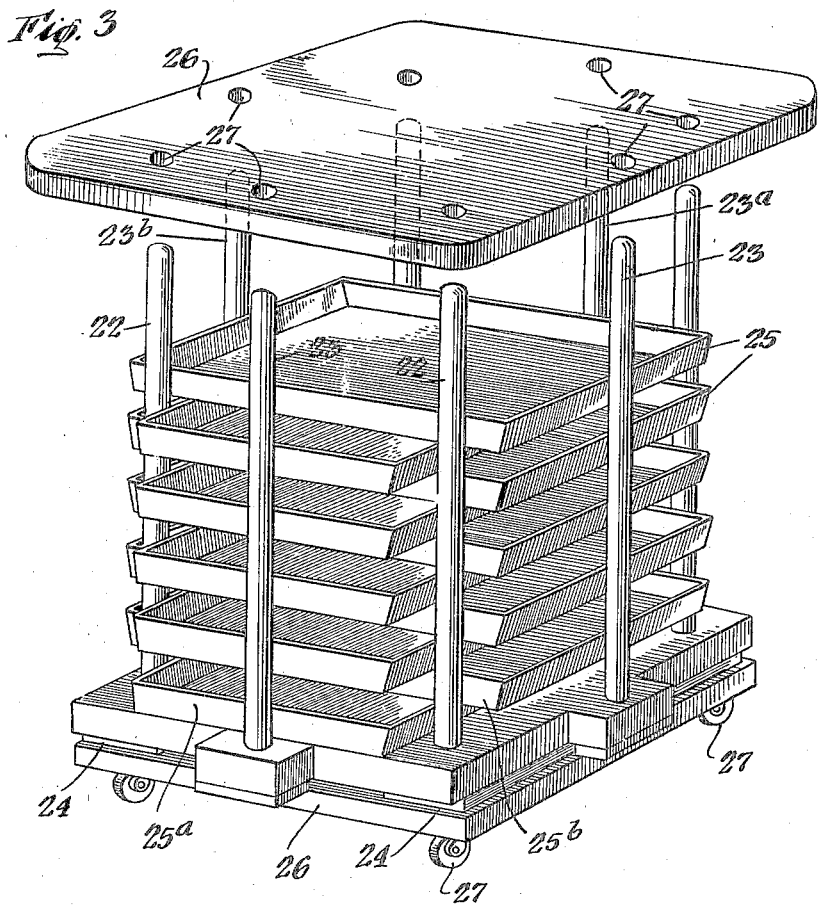
Figure 3 is a perspective view of the device shown in Figures 1 and 2, loaded with pans and showing the relation of the cover or upper support.

Referring to Figures 1, 2 and 3, the device there shown comprises a base member 20 provided with a plurality of sockets 21 into which rods 22, 23, may be inserted, and there supported upon cross members 24 respectively enclosing the bottoms of the sockets 21. The arrangement of sockets 30 is such that provision is made for four rods 22 positioned at the corners of a square which is conveniently smaller than the area of the base 20, and wherein the space intermediate the rods at adjacent corners is just wide enough to accommodate the shorter dimension of a baking pan 25 (see Figs. 3 and 4). The device may be conveniently provided with wheels or rollers for moving it from place to place, as by resting the base member 20 upon a truck 26 having casters 27 (for instance, an ordinary "dolly" truck).

It may now be explained, that with the four rods 22 disposed in their sockets 21 of the base 20, the device may be loaded with pans by simply sliding the pans onto the rack between the upright members, the first pan being placed with its longer dimension in one direction, as at 25a in Figure 3, then the next pan being placed directly on top of the first, but with its longer direction at right angles to the first pan, as at 25b in Figure 3, and so on, with the longer dimensions of the pans alternately crossed at right angles, until the stack is completed.

Four additional rods 23 may then be inserted in the sockets 21 provided for them in the base 20, these additional sockets 21 being arranged, as shown, so that each of the rods 23 abuts laterally against the end walls of the pans in the stack, e. g., each rod 23 extending up across one end wall of each pan which has its longer dimension in one direction. As will be seen, the arrangement is thus such that each pan is retained in place by two rods 22 on each longer side and by one rod 23 at each end or shorter side. It will be understood that in many cases it will be desirable to insert two of the rods 23, for example the rods specifically identified 23a, 23b in Figure 3, before making or before finally completing the stack of pans; these rods will then serve as a guide or stop during the insertion of the pans. Upon completion of the stack, a cover plate 26, provided with apertures or sockets 27 adapted to slidably engage the rods 22, 23, may then be disposed down over the device, one aperture 27 being provided in the cover plate to correspond to each of the rods 22, 23, so that the cover plate may be slid down over the rods and cooperate in retaining them in place against lateral distortion.

It may now be explained that in carrying out the baking process, the articles are first shaped from dough, as at 26 (Figure 4), and placed in the rectangular pans 25, for instance, either by directly molding the articles from dough, or by pouring the dough into appropriate portions or subdivisions of the pans, having the desired configurations; and as the pans are thus filled, they are stacked on the carrier device in the manner shown and described. In some circumstances, it may not be desired to carry on further baking operations at once; if so, the entire carrier, loaded with filled pans, may be directly rolled into a refrigerator and there stored until the operator wishes to go ahead with baking,—say, two or three days later. Indeed, such procedure is desirable in baking establishments of even large or moderate size, where a large batch of dough may be made up at one time, and yet actual requirements for completed goods may vary over a period of several days thereafter. By employing the procedure just described, all of the dough may be made up into the desired shapes as soon as it is mixed, thus facilitating and speeding up the later production of the baked articles, particularly, for example, when a special or abnormally large order is received.

Assuming that the articles have been shaped and the pans containing them stacked in the carrier, and that it is now desired to carry on the actual baking process, the entire carrier device, loaded with filled pans, may then be transferred to the usual proofing boxes, and the entire assembly there permitted to stand in an atmosphere of steam for, say, forty-five minutes. It will be understood that other proofing treatments, which sometimes amount to simple storage of the goods (but with full access of air) may be carried out while the goods are in the carrier device, in the manner just described.

Further processing, including baking, and preliminary or subsequent washing or icing or special coating, may thereafter be carried out, it usually being necessary to remove the pans from the carrier for these treatments, inasmuch as ovens of the type now available require the handling of the pans separately and their separate traverse through the oven. Following the baking treatment wherein the articles (as in the course of making coffee ring, for example) may have been first washed with an egg composition, thereafter baked, and thereafter coated with a suitable icing, the pans may again be placed on the carrier in the same manner as described above, viz., re-establishing their stacked relation with corresponding dimensions alternately disposed. If desired, the carrier may then be permitted to stand, and necessary drying or setting of the goods will take place, since full access of air is afforded to the interior of the pan, at all times.

The distribution of the goods from the central baking plant to retail shops may then be carried out simply by transporting to the shop the carrier device, still loaded with pans in the described stacked relation, containing the articles to be delivered to the shop. The carrier, full of pans, may be directly moved onto the delivery truck, and from the truck, taken directly into the retail shop, and there kept until the articles are sold or otherwise disposed of. Indeed, it is not usually necessary to take special time for drying or setting the goods; since they can thus be handled and transported in their original baking pans and usually without disturbing the stacked relation of the latter at all, the carriers may be taken directly from the processing treatment, i. e., as soon as loaded with pans of otherwise completed goods, to the delivery truck itself, and the necessary drying or setting will automatically take place during such delivery,—so as to afford a very considerable conservation of time, not only avoiding the transfer of the goods from pans to shipping boxes, but saving the setting or drying time itself. Furthermore, as explained above, the shop keeper has usually heretofore received his goods in shipping boxes so closed or stacked as to render inexpedient, or unpracticable, any immediate observation or visual check of the goods as he receives them; but with the arrangement and procedure of the present invention, wherein the goods may be delivered to the shop in pans having a stacked relation such as shown and described, immediate visual inspection of the entire lot is afforded; and the shop keeper may at once see what is in each pan, without even disturbing the stacked relation, much less without specially opening each of a large number of containers.

Figure 4:
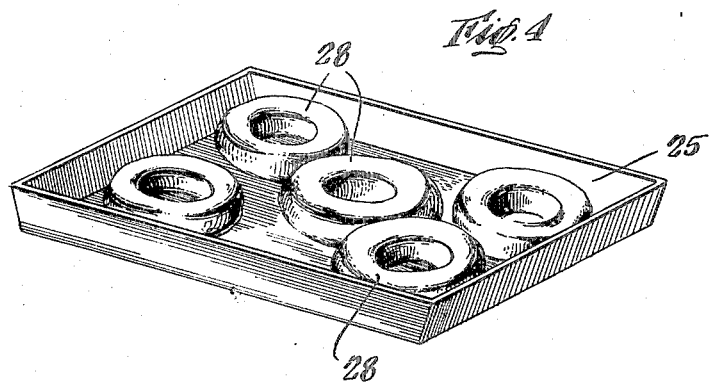
Figure 4 is a perspective view of a pan particularly adapted for use in the invention, showing an arrangement of goods therein.

It will now be appreciated that the procedure is preferably carried out with pans 25 of sufficient height that their side walls rise above the ultimate height of the finished goods therein; in this way, the same pans may be used for the entire processing treatment. It will also be appreciated that the savings afforded by the present method and apparatus are very considerable, particularly, for example, in contrast to the prior procedures mentioned hereinabove, involving the use of shelved racks which must include the bulk required by the air space above each pan. The carrier devices of the present invention are not only in themselves lighter and simpler and therefore less costly, but they occupy a great deal less space for a given capacity in goods—a factor of prime importance in the use of proof boxes, refrigerators, and the like. For example, whereas a common type of shelved rack heretofore used has been adapted to receive two tiers of eighteen inch by twenty-six inch pans, holding a total of thirty-six pans in all (each such pan being, say, two inches high and adapted to hold five coffee rings, as shown in Figure 4) a carrier device of the present invention will hold the same number of pans, but with a total loaded bulk of only about 60% of that of the first-mentioned rack.

Another and particularly inexpensive and advantageous form of the carrier device is shown in Figure 5. This device includes the flat base member 20, provided with casters 27 for moving the device about, and having at each of two adjacent corners the vertically extending corner plates generally designated 30. These corner plates each consist of two upright surfaces 31, 31$a$, disposed at a right angle to each other, re-entrant from an adjacent corner of the square base 20; the surfaces 31$a$ which are parallel with each other, of the two corner plates, are spaced apart just sufficiently to allow a pan 25 to be inserted and retained flatwise between them. Each corner plate is also provided at its outer sides with pan-abutting or end-retaining strips 32, 32$a$ bent at right angles to the respectively adjacent faces 31, 31$a$ and each disposed so as to abut the end of a pan which is placed with its side wall against the adjacent face 31 or 31$a$. The upper edges of the adjacent, or aligned, strips 32a, of the two corner plates, are conveniently tied or connected with a rod or rigid strip 33. It will now be seen that the pans may be readily stacked in this device, against the corner plates 30, 30, in the same manner as shown in Figure 3 (see also Figure 6, illustrating the abutment of the cross-stacked pans against the corner plates of the character just described). That is, one pan may be placed on the platform 30 with one of its long side edges against the outer surfaces 31 of the two corner plates,—the adjacent abutting strips 32 being spaced apart just sufficient to admit the ends of the pan between them. Then the next pan is inserted in crossed relation so that its end goes between the parallel faces 31a of the two corner members, and abuts against the aligned strips 32a of these members; and the stack of pans is thereafter built up in that way.

At the side of the base 20 opposite the two corner members 30, 30, there is provided a socket 35, adapted to seat and support a removable rod 36, which extends upwards to the height of the tops of the members 30 and at its upper extremity has linked or hinged thereto a cross member or rod 37 provided with a hook at its further extremity to slip into, and be held by, a corresponding aperture or eye in the cross member 33. It may now be explained that after the stack of filled pans has been built up on the base 20 against the corner supports 30, 30, the rod 36 is inserted into the socket 35 and the linked cross member 37 dropped down and its hook fitted into the eye 37, as explained. It will be appreciated that member 36 will thus abut the ends of alternate pans in the stack, i. e., will extend up along the end walls of each pan that crosses against the directly opposite strip surfaces 32a, 32a,—thus positively holding those pans against any lateral displacement. At the same time, the alternate pans, which lie across those just mentioned, are retained at their ends by the opposed (parallel) faces 32, 32 between which they have been placed, and the natural weight of the pans in stacked relation, together with the abutment of the aligned faces 31, 31, will, by friction and direct abutment, be generally sufficient to hold these pans securely. Indeed, the fit of the assembly 36, 37 may be such as to be snug when the hook of 37 is secured in the eye 33, thus affording a positive clamping action upon the stack of pans.

Another embodiment of the carrier device of the invention, presently preferred for many purposes, is shown in Figure 6. This device is similar to that of Figure 5 except that there are three corner supporting members 30, provided at each of three corners of the square base 20. With this arrangement, it is generally unnecessary to have any removable or additional locking device (such as the assembly 36, 37 in Figure 5, or the end-retaining rods 23 in Figures 1–3). As will be seen from Figure 6, the corner supporting plates or angles 30 are so arranged that lateral support or abutment is provided for each side of three corners of each pan. The pans, however, may be inserted in a substantially horizontal or lateral direction, as before, and with practically the same ease as in the case of the device of Figure 5; the workman merely tips or tilts the pan very slightly about an axis along its longer dimension, so that the pan may be slid in past that one of the outer abutting strips or faces 32b behind which the pan is to rest. Where pans of the size mentioned above are used, for example, the faces 32 (or 32a or 32b) need be no more than about one inch in width, so that the pans need only be tilted slightly to get them into place. It will now be apparent that as the stack is built up, each pan is held in a horizontal position, by its own weight and that of the pans above it, and therefore is positively retained against lateral displacement in any direction, by the abutment of three surfaces 31 (or 31a) and three surfaces 32 (or 32a) and 32b, as shown in Figure 6.

In many cases, particularly where the devices are used for transporting or handling the goods during operations in a central bakery, no enclosure need be provided for the cross-stacked pans; indeed, as already explained, it is of considerable advantage during much of the process (as in proofing and in setting or drying) that the structure be such as to afford free circulation of air into and through each pan. In some cases, however, as where the goods must be handled out-of-doors in bad weather, or where a dusty atmospheric condition is to be guarded against during transportation of the goods to a retail shop, a closure means, such as illustrated in Figures 7 to 9 inclusive, may be provided. The arrangement shown in these figures is particularly adapted to form a part of the structure illustrated in Figure 6, although it will now be appreciated that suitable boxing or closure means may be provided for other forms of the carrier device.

As shown in Figure 8, each vertical space intermediate adjacent corner members 30 is enclosed by vertical plates 40 of like height, and the "open" corner of the device (at 41a in Figure 6) may be conveniently enclosed by a pair of hinged plates 41, 42, each provided at its vertical edge opposite the hinges with appropriate pins 43 (see Figure 7), which may be readily dropped into loops or sockets 44, disposed at the edge of the end strips or surfaces 32a. It will be understood that the other side plates 40, 40, may likewise be removably secured to the adjacent faces 32 by similar pin and socket or separable hinge arrangements; and that in each case the plates 40, 41 and 42 may, if desired, be further supported by resting on the surface of face 20. The structure removably boxed in by the several plates in the manner just described, may also be provided with a removable flanged cover 45 (see Figure 9), having its downwardly depending flange 46 of a configuration conforming to the plan of the boxed-in structure comprising the corner members 30 and the plates 40, 40, 41 and 42. The resulting arrangement provides an effective and yet easily removable closure means for the stacked pans.

Although the invention has been illustrated in connection with elongated rectangular pans (sometimes called "sheet pans") of a type convenient for baking a great many different kinds of articles, such as rolls, buns, coffee ring, cookies, and the like, the procedure and apparatus of the invention may be conveniently adapted or employed for the use of many other different kinds of pans. For example, square pans may be stacked in the desired crossed relationship, with the corresponding dimensions of each pan at an angle of 45° to those of the next adjacent pan, and the stack of pans may be readily retained in this relationship by upright members (like the upright rods 22, 23 in Figure 3) suitably disposed along lines of intersection of the pan walls in the stack. Similarly, for example, strapped sets of round or square individual cake pans,—each set comprising, say, a rigid unit of three or four pans held together in a single row,—may be easily handled in accordance with the present invention. Such pans may be arranged in a single crossed stack of the character shown in Figures 3 and 6, or may be stacked in crossed relation with two or more long pans side by side at each level, i. e., by crossing successive pairs or groups of pans.

Although apparatus of the type here illustrated is shown in Figures 3 and 6, with a load of, say, ten pans, it will be understood that in actual use, the height of the supporting means (22, 23, or 30, 30) is usually such as to accommodate a great many more pans in a stack. It has been found convenient, for instance, to carry from thirty to forty two-inch pans (or considerably more, in the case of shallower cookie pans, or the like) on carrier apparatus of the types here illustrated.

The apparatus itself may be constructed of any suitable material affording the desired strength, lightness of weight, and durability; for example, apparatus of the type shown in Figures 1 to 3 inclusive has been conveniently constructed with a wooden base or platform 20, and removable wooden rods 22, 23, and a wooden retaining cover 26. The apparatus of Figures 5 and 6 has been effectively made of sheet metal, base 20 being merely a downwardly flanged plate, and having welded to it the upright supporting members 30 which may each be constructed of a single sheet of steel or like rigid metal appropriately bent to the configuration shown and described.

It will now be seen that the invention provides convenient and effective apparatus for handling goods during at least a great many of the stages of ordinary bakery operation, including ultimate delivery of the goods to the retail shop and storage of the goods there until they are actually dispensed. Very considerable savings of space and labor are effected throughout the process and instances of handling the actual goods (for example, where it has been hitherto necessary to transfer the goods from baking pans to shipping pans or boxes) may be eliminated; and the savings of time, mentioned hereinabove, are extremely valuable in getting the goods into the retail shop as soon as possible after baking, and thus in the freshest possible condition. Plant operations are not only greatly simplified, but the cost of equipment is curtailed and the different kinds of equipment necessary for handling the goods are reduced to a minimum; that is, instead of using both baking pans and shipping boxes or pans, a single baking pan may suffice for the entire operation from the time the dough is shaped to the time that the finished goods reached the retail shop, and the baking pans, moreover, are usually lighter and less expensive than the presently used shipping boxes or pans,— the latter being subjected to a wear and tear, in handling, which the present carrier devices avoid in the case of the baking pans.

This application is a division of my copending application Serial No. 124,070, filed February 4, 1937, for Procedure and apparatus for the manufacture of baked goods.

It will be understood that the invention is not limited to the specific procedure and embodiments herein described or shown, and set forth by way of illustration, but that the described apparatus, although designed to be used in the combinations and relations stated, may be curtailed or modified or used in other relations or combinations and the invention carried out in other ways and to other ends, without departure from the spirit as defined by the following claims.

I claim:

1. Apparatus for supporting a plurality of baking pans in cross-stacked relation and for guiding each pan into the desired position in the crossed stack upon insertion of said pan in a substantially horizontal position, comprising in combination, a base member adapted to support the pans in cross-stacked relation one upon another, and means for holding the cross-stacked pans against lateral displacement, including guide means mounted on the base member for laterally receiving each of a plurality of vertically spaced pans inserted into one predetermined position and guide means mounted on the base member for laterally receiving each of a plurality of vertically spaced pans inserted into another predetermined position, each of said guide means being adapted to abut a plurality of walls of each pan to be received thereby, for positively positioning the pan upon its insertion, and said guide means being cooperatively disposed to provide free vertical areas above the periphery of the base member, for cross-stacking the pans by insertion of each in a substantially horizontal position.

2. Apparatus for supporting a plurality of baking pans in cross-stacked relation and for guiding each pan into the desired position in the crossed stack upon insertion of said pan in a substantially horizontal position, comprising in combination, a base member adapted to support the pans in cross-stacked relation one upon another, upright means mounted on said base member for receiving and laterally retaining the pans on the base member, said means being disposed to receive each pan upon insertion thereof in a substantially horizontal position and said means including vertically extending portions adapted to abut a plurality of walls of each of the pans disposed in each of the directions of the crossed stack, for guiding each pan into predetermined position therein, and means cooperating with said vertically extending portions for holding the cross-stacked pans against lateral displacement in any direction.

3. Apparatus for supporting a plurality of baking pans in cross-stacked relation and for guiding each pan into the desired position in the crossed stack upon insertion of said pan in a substantially horizontal position, comprising in combination, a base member adapted to support the pans in cross-stacked relation one upon another, and means extending vertically from said member for laterally guiding and retaining the pans upon insertion of the same successively in substantially horizontal position, said means comprising a plurality of guide devices respectively disposed to define each of a plurality of vertical re-entrant angles of the crossed stack, and each of said guide devices comprising vertical walls respectively adapted to abut the sides of the defined re-entrant angle of stacked pans, and vertical flanges for respectively abutting the next adjacent walls of the pans forming said angle.

4. Apparatus for supporting a plurality of baking pans in cross-stacked relation and for guiding each pan into the desired position in the crossed stack upon insertion of said pan in a substantially horizontal position, comprising in combination, a base member adapted to support the pans in cross-stacked relation one upon another, guide means for defining the position of the pans in the stack thereon, said guide means including a plurality of devices which extend vertically from the base member at a corresponding plurality of adjacent corners of the stack, and each of said devices having wall portions to abut the sides of a re-entrant angle of the stack and adjacent wall portions to abut the sides of the stack next adjacent said angle, and cooperating displaceable means for positively clamping the cross-stacked pans on the base and in abutment with said devices.

5. A device for holding a plurality of baking pans in predetermined cross-stacked relation, comprising in combination, a base member adapted to support the crossed stack of pans, and a plurality of upright members mounted on the base member, including upright members respectively disposed to define the apex of each re-entrant angle of the stack and upright members respectively disposed to abut each exterior face of the stack, a plurality of said last mentioned upright members being removably mounted, whereby the same may be removed during loading to permit horizontal insertion of the pans into their predetermined positions.

6. A device for holding a plurality of baking pans in predetermined cross-stacked relation, comprising in combination, a base member adapted to support a stack of rectangular pans longer in one direction than the other and alternately crossed at right angles, and three supporting devices disposed on the base member for respectively retaining three of the four corners of the stack, each of said devices comprising vertical wall portions to define the re-entrant angle at the stack corner and having associated vertical wall portions to abut the adjacent outer faces of the stack, those of said last-mentioned wall portions which are engageable with the faces of the fourth stack corner, comprising narrow flanges, to permit substantially horizontal insertion of each pan by tipping the same to clear the adjacent flange.

7. Apparatus for supporting a plurality of rectangular baking pans, comprising a base member, and means extending upwardly therefrom, for laterally supporting a plurality of pans in cross-stacked relation on the base member, said supporting means having vertically extending portions for laterally abutting each of three sides of pans disposed in one direction, and vertically extending portions for laterally abutting each of three sides of pans disposed in another direction, and said supporting means having its pan-abutting portions disposed to provide an at least substantially free vertical area opposite the middle of the aforesaid three sides of pans disposed on in direction and an at least substantially free vertical area opposite the middle of the aforesaid three sides of pans disposed in the other direction, for ready insertion of each pan in a substantially horizontal position and directly into abutment with the aforesaid holding portions, and said supporting means having cooperating means for positively holding the cross-stacked pans in abutment with the aforesaid vertically-extending portions and against any displacement in a direction perpendicular to the stack, after the pans have been stacked.

JOHN MacMANUS.

CERTIFICATE OF CORRECTION.

Patent No. 2,187,355. January 16, 1940.

JOHN MacMANUS.

It is hereby certified that error appears in the printed specification of the above numbered patent requiring correction as follows: Page 6, second column, lines 21 and 22, claim 7, for the words "on in" read in one; and that the said Letters Patent should be read with this correction therein that the same may conform to the record of the case in the Patent Office.

Signed and sealed this 12th day of March, A. D. 1940.

(Seal)
Henry Van Arsdale,
Acting Commissioner of Patents.